United States Patent
Bauer et al.

(10) Patent No.: US 7,073,466 B2
(45) Date of Patent: Jul. 11, 2006

(54) PROCEDURE FOR REGULATING THE COMBUSTION PROCESS OF AN HCCI INTERNAL COMBUSTION ENGINE

(75) Inventors: Erwin Bauer, Regensburg (DE); Dietmar Ellmer, Regensberg (DE); Thorsten Lauer, Regensberg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/637,643

(22) Filed: Aug. 11, 2003

(65) Prior Publication Data

US 2004/0134450 A1    Jul. 15, 2004

(30) Foreign Application Priority Data

Aug. 14, 2002    (DE)    ................ 102 37 328

(51) Int. Cl.
*F02B 3/00*    (2006.01)

(52) U.S. Cl. .................................. 123/27 R; 123/435
(58) Field of Classification Search .............. 123/27 R, 123/435
See application file for complete search history.

(56) References Cited

U.S. PATENT DOCUMENTS

| | | | |
|---|---|---|---|
| 5,875,743 A * | 3/1999 | Dickey ..................... | 123/25 C |
| 6,276,334 B1 * | 8/2001 | Flynn et al. ................ | 123/435 |
| 2003/0145836 A1 * | 8/2003 | Linna et al. ................ | 123/501 |

* cited by examiner

*Primary Examiner*—Tony M. Argenbright
*Assistant Examiner*—Katrina B. Harris
(74) *Attorney, Agent, or Firm*—Morrison & Foerster LLP

(57) ABSTRACT

For an effectively working regulation of the combustion process in the HCCI mode, a modeled combustion process, to be described by internal variables of state, is formed by using process-influencing variables. Output variables of the actual and modeled combustion process are then used to regulate the process-influencing variables.

13 Claims, 1 Drawing Sheet

PROCEDURE FOR REGULATING THE COMBUSTION PROCESS OF AN HCCI INTERNAL COMBUSTION ENGINE

CLAIM FOR PRIORITY

This application claims priority to International Application No. 10237328.0 which was filed in the German language on Aug. 14, 2002, which is hereby incorporated by reference.

TECHNICAL FIELD OF THE INVENTION

This invention relates to a method for regulating the combustion process of an internal combustion engine that can at least be operated under specific operating conditions with controlled self ignition (HCCI mode).

BACKGROUND OF THE INVENTION

When operating an internal combustion engine in the HCCI mode (homogenous charge compression ignition) sometimes also called CAI (controlled auto ignition), ATAC (active thermo atmosphere combustion) or TS (Toyota Soken), the air/fuel mixture is not ignited by a spark ignition, but by controlled self ignition. The HCCI combustion process can, for example, be evoked by a large amount of hot residual gases and/or by a high compression and/or a high inlet air temperature. One requirement for self ignition is a sufficiently high energy level in the cylinder. Internal combustion engines that can be operated in the HCCI mode, regarding both spark ignition and diesel engines are known, see e.g. U.S. Pat. No. 6,260,520, U.S. Pat. No. 6,390,054, DE 199 27 479 and WO 98/10179.

Compared with a conventional spark-ignited combustion, the HCCI combustion has the advantage of reduced fuel consumption and limited harmful substance emissions. However, it is not easy to regulate the combustion process and particularly to control the self ignition of the mixture. Therefore, a regulation of controlling variables for e.g. the fuel injection (injection volume or injection point and duration), internal or external exhaust gas re-circulation, inlet and outlet valves (variable valve control), exhaust gas counter pressure (exhaust flap) is required. If necessary an ignition support, air inlet temperature, fuel quality and compression ratio (for internal combustion engines with changing compression ratio) can be regulated. However, in order to be able to regulate these process-influencing variables in the sense of an optimum combustion process perhaps with regard to efficiency, engine protection, quiet running, noise development, harmful substance emissions and fuel consumption, instruments for evaluating the quality of the combustion process are required.

In the case of previous solutions one was generally only restricted to evaluating individual measurable output variables of the combustion process. A particularly expressive variable is the combustion chamber pressure. This can, e.g., be detected with indicator crystals that are directly introduced into the cylinder head or with piezopressure sensors that are integrated in the cylinder head gasket. Another possibility is an ion emission measurement by which the combustion process can be evaluated qualitatively. Apart from these solutions being complex and costly, they only conditionally allow a comprehensive and precise evaluation of the quality of the combustion process.

SUMMARY OF THE INVENTION

According to an aspect of the invention, a procedure for regulating the combustion process of an internal combustion engine in the HCCI mode that works effectively based on a comprehensive quality evaluation of the combustion process and is still cost-effective is provided.

According to this aspect of the invention, a combustion process, modeled by the internal variables of state to be described, is formed in the HCCI mode with the aid of process-influencing variables, and output variables of the modeled combustion process for regulating the process-influencing variables are used.

For practical reasons, the modeled combustion process is preferably formed based on cycle processes in the pressure/volume diagram and temperature/entropy diagram. The modeled combustion process is described with internal variables of state such as e.g. combustion curve, pressure curve, temperature curve, peak pressure, indicated average pressure, efficiency, combustion concentration point, inner energy input.

As far as the internal variables of state can be detected by measuring, it is advantageous to synchronize and calibrate the modeled combustion process by the available measured values of these variables of state. In this manner, an increasingly more exact and simplified model is obtained step by step. The modeled combustion process should also be corrected continuously by comparing the output variables of the actual combustion process with the modeled combustion process.

As output variables, the customary variables measured in modern engine controls (motor management) such as, e.g., the knock sensor signal, the exhaust gas temperature, the air fuel ratio (lambda value), harmful substance content ($NO_x$, HC) and combustion chamber pressure are considered. For practical reasons, the knock sensor signal is used as the leading output signal. The output variables of both the modeled and actual combustion processes are then preferably fed to a regulator that regulates the process-influencing variables by using reference presets. The above-mentioned variables are considered as process-influencing variables. Using a pilot control for the process-influencing variables is very advantageous within this context.

This invention provides an overall procedure for regulating the combustion process in the HCCI mode of an internal combustion engine. The procedure can be used both in spark ignition and diesel engines. On the basis of the overall consideration of the combustion process, the invention allows a process regulation that can be optimized with regard to regulation criteria such as efficiency of the combustion process, protection of the internal combustion engine, quiet running, noise development, harmful substance emissions and fuel consumption.

Another advantage of the invention in which, for practical reasons the knock sensor signal is considered in terms of the concentration point, is the fact that for determining output variables, the invention uses sensors, such as especially the knock sensor, that are already available in modern engine controls. A large part of the evaluation functionality of the relevant signals, especially the knock sensor signal, can also remain unchanged so that new circuits and costly algorithms as well as software modules need not be redeveloped.

DETAILED DESCRIPTION OF THE PREFERRED EMBODIMENTS

Figure 1:
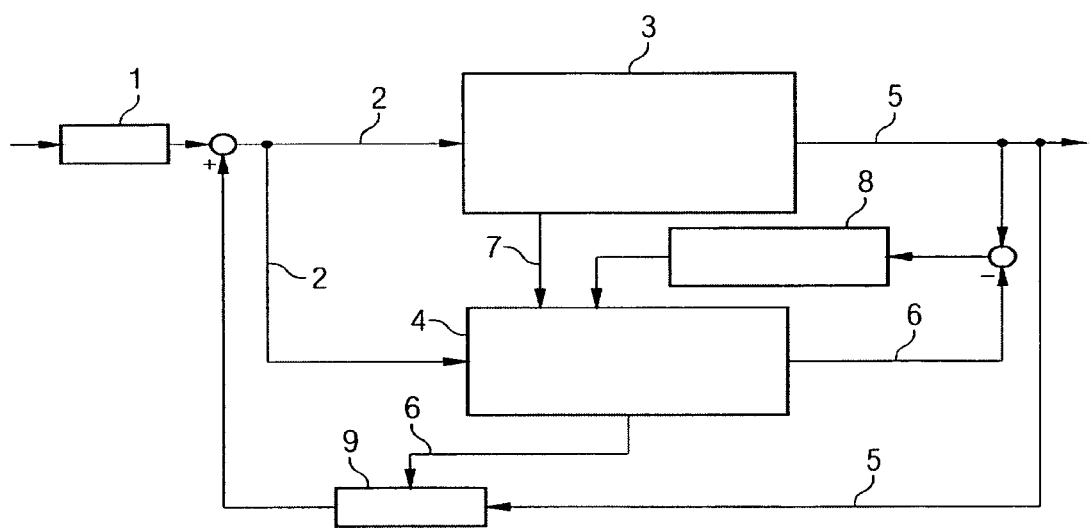
FIG. 1 shows a signal flowchart for regulating the combustion process of an internal combustion engine in the HCCI mode, according to an aspect of the invention.

FIG. 1 illustrates the regulation of the combustion process of an internal combustion engine (not shown) in the HCCI mode. The internal combustion engine is, for example, a four cylinder spark ignition engine. As has already been mentioned, the procedure according to the invention can also be used for other internal combustion engines, for example, on diesel engines.

In FIG. 1, a pilot control has been provided for the variables influencing the combustion process 2. First of all, process-influencing variables are the quantity and time control of the fuel to be injected, the rate of the external or internal returned exhaust gas, the (variable) control of the inlet and outlet valves, the counterpressure of the exhaust gas that can be controlled, e.g. by an exhaust flap, an emergency ignition (ignition support) of the air/fuel mixture provided under circumstances by an igniter, the inlet temperature of the sucked in air that can e.g. be influenced by a heat-transfer agent, the fuel quality and the compression ratio (for internal combustion engines with adjustable compression ratio). Expressed in another way, the variables are adjusting signals for the actuators of the fuel injection valves, the inlet and outlet valves, the exhaust gas return valves, etc.

The variables 2 are used for controlling the actual combustion process 3 that is symbolized by a block in FIG. 1. The actual combustion process 3 is characterized by so-called internal variables of state. These are especially the following variables of state: local and time-dependent pressure curve in the cylinder, peak pressure of the combustion, temperature distribution in the cylinder, combustion concentration point (center of gravity of the area of the pressure curve over the time or the crankshaft angle, e.g. 8° according to the top dead center), combustion speed and internal energy entry.

The internal variables of state can be used for describing a modeled combustion process 4, therefore, a model of the actual combustion process 3. In addition, the process-influencing variables 2 are also used to calculate the modeled combustion process 4 that is also symbolized by a block in the signal flow chart.

Basically, the modeling of a combustion process is known. The basis for this is formed by the calculation and representation of the cycles occurring in the cylinder in the P, V diagram (pressure/volume diagram) and in the T, S diagram (temperature/entropy diagram). Simple, ideal cycles such as the Seiliger process and open comparison processes such as the so-called "work process of the perfect engine" are known. However, these days models are also known that allow another approach to the actual combustion process.

Well-known is, e.g., the so-called two-zone model that allows statements about the indicated average pressure, combustion, pressure and temperature curve, combustion concentration point, etc. In the case of the two-zone model, it is assumed that the load in the cylinder during combustion consists of two homogenous zones with regard to pressure, temperature and composition and indeed a first zone of unburned mixture and a second zone of burned mixture. The two homogenous zones are separated by an infinitesimal thin flame front and exchange mass with each other, but not heat. In this case, the objective is determining the temperature as a function of time in the burned and unburned mixture as well as the so-called combustion function that represents the ratio of the burned fuel mass to the overall fuel mass. The actual process is then basically calculated in two steps as a function of time or the angle of the crankshaft.

In a first step, one starts from the (known) cylinder cutoff on commencement of the reaction. The temperature can be determined by using the thermal equation of states for ideal gases and the empirically determined variables combustion chamber, volume above the piston and carbureted fuel composition. In a second step, the combustion curve in both zones is then described by using the thermal equation of states for ideal gases and the first law of thermodynamics for open systems. This leads to an equation system with several equations for determining the combustion function, the temperature in the unburned, the temperature in the burned and the composition of the burned mixture. This modeling allows statements about e.g. the temperature, the converted mixture mass, the pressure and the combustion rate over the angle of the crankshaft.

Another improvement of this modeled combustion process allows equations for the quantity balance and energy balance, and these also allow statements about the efficiency of the combustion process. Further information about this can, for example, be found in the "Handbuch Verbrennungsmotor" (combustion engine manual), by Richard van Basshuysen/Fred Schafer, 2nd edition, July 2002, Section 5.3.2.

For the practical embodiment and calculation of such a modeled combustion process, well-known numerical and graphical programming methods are available that are obtainable as complete toolboxes such as Matlab/Simulink, AscetSD or Matrix X on the market.

Sensors can record some of the internal variables of state of the actual combustion process 3. This especially applies both to pressure vibrations that can anyhow be recorded by existing knock sensors in modern internal combustion engines, and to the pressure curve in the cylinder that can be recorded by pressure sensors as has already been explained above. For practical reasons, the modeled combustion process 4 is synchronized and calibrated using such measurable internal variables of state as indicated by a connection 7 between the actual and modeled combustion process 3 or 4. Because of this, the model of the combustion process can increasingly be refined.

As output variables 5 of the actual combustion process 3, signals of the conventionally provided sensors such as the crankshaft sensor, the exhaust gas temperature sensor, the lambda probe, the exhaust gas emission sensors ($NO_x$, HC) and especially the above-mentioned knock sensor are made available. The modeled combustion process 4 supplies corresponding output variables 6. The output variables 5, 6 of the actual combustion process 3 and the modeled combustion process 4 are compared continuously with one another referring the difference 8 between the output variables 5 and 6 to the modeled combustion process 4 and traced according to this process. As has already been mentioned in the description introduction, the knock sensor signal is used here as the leading output variable by means of which the peak pressure in the cylinder can be determined. This represents a very important parameter with regard to self ignition of the air/fuel mixture. Through the described procedure a model of the actual combustion process is obtained that is so accurate and reliable that the actual combustion need not be observed.

The output variables 5 of the actual combustion process 3 and the output variables 6 of the modeled combustion process 4 are fed to a regulator 9. The regulator 9 contains reference presets such as the combustion curve, final value, position of center of gravity, etc., that were determined with due consideration of the above-mentioned regulation criteria such as efficiency of the combustion process, protection of the internal combustion engine, quiet running (moment neutrality), low-noise, harmful substance emissions, and fuel consumption. With the help of the reference presets, the regulator then varies the process-influencing variables 2 in the desired way.

The invention claimed is:

1. A method for regulating the combustion process of an internal combustion engine that can be operated with self-controlled self ignition (HCCI mode) at least under specific operating conditions, comprising:

during operation with controlled self ignition, forming a modeled combustion process described by internal variables of state from combustion process influencing variables based on thermodynamic cycle processes, and using the output variables of the modeled combustion process to regulate the process influencing variables.

2. The method according to claim 1, wherein the modeled combustion process is corrected by a comparison between the output variables of the actual and modeled combustion process.

3. The method according to claim 1, wherein the modeled combustion process is synchronized and calibrated by measurable internal variables of state.

4. The method according to claim 1, wherein, at least one of combustion curve, temperature curve, pressure curve, peak pressure, indicated average pressure, efficiency, combustion concentration point and internal energy entry is used as internal variables of state.

5. The method according to claim 1, wherein the modeled combustion process is formed based on cycle processes in the pressure/volume diagram and the temperature/entropy diagram.

6. The method according to claim 5, wherein, when modeling the cycle processes, a two-zone model is used, subdividing a load in the cylinder in a zone of unburned air/fuel mixture and a zone of burned air/fuel mixture.

7. The method according to claim 1, wherein, at least one of fuel injection volume, duration and point in time, external and internal exhaust gas re-circulation rate, exhaust gas counter pressure, variable inlet and outlet valve control, ignition support, air inlet temperature, fuel quality, and variable compression ratio is used as the process-influencing variables.

8. The method according to claim 1, wherein, at least one of rotational speed of the crankshaft, knock sensor signal, exhaust gas temperature, air/fuel ratio (lambda), content of harmful substance emissions (NOX, HC), and combustion chamber pressure is used as the output variables.

9. The method according to claim 8, wherein the knock sensor signal is used as a leading output signal.

10. The method according to claim 1, wherein, for regulating the process-influencing variables, the output variables of the actual combustion process are used in addition to the output variables of the modeled combustion process.

11. The method according to claim 1, wherein, at least one of efficiency of the combustion process, protection of the internal combustion engine, quiet, noise development, harmful substance emissions, and fuel consumption are used as the regulating criteria for regulating the process influencing variables.

12. The method according to claim 11, wherein the output variables of both the actual and modeled combustion processes are fed to a regulator that, based on reference presets corresponding to the regulating criteria, regulates the process-influencing variables.

13. The method according to claim 1, wherein a pilot control is provided for the process-influencing variables.

* * * * *